United States Patent
Pliml, Jr.

(10) Patent No.: US 7,168,683 B2
(45) Date of Patent: Jan. 30, 2007

(54) OIL DRAIN VALVE

(75) Inventor: Frank V. Pliml, Jr., Arlington Heights, IL (US)

(73) Assignee: Illinois Tool Works Inc, Glenview, IL (US)

( * ) Notice: Subject to any disclaimer, the term of this patent is extended or adjusted under 35 U.S.C. 154(b) by 75 days.

(21) Appl. No.: 11/063,014

(22) Filed: Feb. 22, 2005

(65) Prior Publication Data

US 2005/0258392 A1  Nov. 24, 2005

Related U.S. Application Data

(60) Provisional application No. 60/573,960, filed on May 24, 2004.

(51) Int. Cl.
*F16K 31/00* (2006.01)
(52) U.S. Cl. .................. 251/353; 251/345; 184/1.5; 184/80; 222/499; 222/529
(58) Field of Classification Search ............... 251/345, 251/353; 184/1.5, 80
See application file for complete search history.

(56) References Cited

U.S. PATENT DOCUMENTS

| | | | | |
|---|---|---|---|---|
| 247,668 | A * | 9/1881 | Loftus ........................ | 137/590 |
| 596,639 | A | 1/1898 | Tucker | |
| 1,458,718 | A * | 6/1923 | Lord ........................... | 137/590 |
| 1,512,333 | A * | 10/1924 | Harberson .................. | 137/613 |
| 1,859,126 | A * | 5/1932 | Boeuf ........................ | 222/505 |
| 2,591,514 | A * | 4/1952 | Courtot ....................... | 251/297 |
| 2,841,314 | A * | 7/1958 | Munson et al. ............. | 222/519 |
| 3,094,306 | A | 6/1963 | Conrad | |
| 3,219,278 | A * | 11/1965 | Santarelli .................... | 239/579 |
| 3,425,664 | A | 2/1969 | Niskin | |
| 3,587,641 | A | 6/1971 | Johnson ...................... | 137/608 |
| 3,642,249 | A | 2/1972 | Cruse ......................... | 251/344 |
| 3,880,401 | A | 4/1975 | Wiltse ........................ | 251/205 |
| 4,055,179 | A | 10/1977 | Manschot et al. .......... | 128/275 |
| 4,162,691 | A | 7/1979 | Perkins ....................... | 137/613 |
| 4,231,547 | A * | 11/1980 | Manfroni ................... | 251/210 |
| 4,679,618 | A * | 7/1987 | Farkas ........................ | 165/71 |
| 5,096,158 | A * | 3/1992 | Burdick et al. ............. | 251/144 |
| 5,386,881 | A * | 2/1995 | Eshelman ................... | 184/1.5 |
| 5,749,561 | A | 5/1998 | Worthington .............. | 251/229 |
| 5,782,455 | A | 7/1998 | Burnworth .................. | 251/345 |
| 2003/0047702 | A1 | 3/2003 | Gunnarsson et al. ....... | 251/297 |

* cited by examiner

*Primary Examiner*—J. Casimer Jacyna
(74) *Attorney, Agent, or Firm*—Mark W. Croll; Paul F. Donovan

(57) ABSTRACT

A drain valve to be used with numerous drain applications, such as draining fluid from an engine, includes in an exemplary embodiment a valve body, an o-ring and a cap. In another exemplary embodiment, the drain valve includes a valve body, an o-ring, a cap retainer and a cap. The drain valve eliminates the need for a tool, such as a wrench, to drain the fluid from the engine, for example. The drain valve includes a push-pull or a twist-and-pull cap feature to manipulate the valve; however, the drain cap remains on the drain valve and therefore cannot be lost or misplaced. Moreover, the drain valve includes a drain cap that is rotatable to direct the fluid flow out the valve and also provides an easy grip for opening and closing the valve.

20 Claims, 9 Drawing Sheets

OIL DRAIN VALVE

CROSS REFERENCE TO RELATED APPLICATION

This Non-Provisional Application claims benefit to U.S. Provisional Application Ser. No. 60/573,960 filed May 24, 2004.

FIELD OF THE INVENTION

The present invention relates generally to drain plugs, and more particularly, to drain valves for a small gas engine.

BACKGROUND OF THE INVENTION

It is known that drain plugs are installed on small engines typically below the oil sump of the engine and used as a removable plug to permit the fluid in the sump to be drained and replaced. The known drain plugs conventionally include at one end a threaded portion that mates with a threaded opening in the oil sump. At the opposite end, the known drain plugs include a tool interface, such as a hexagonal shaped head, that, with the aid of a tool, such as a wrench, is used to install the drain plug.

The known drain plugs, however, have several drawbacks. For example, the known drain plugs must be removed from the oil sump before the oil will drain. To remove the drain plug, a tool must be used to remove the plug. As a loose item, the removed drain plug is prone to being lost or misplaced. Occasionally, during the replacement of the plug, the mating threads are not properly aligned creating binding of the threads, an improper seal between the plug and the oil sump, or possibly stripping of the threads. Other drawbacks and disadvantages exist with respect to known drain plugs that are overcome by the present invention.

SUMMARY OF THE INVENTION

The present invention is directed to a drain valve that may be used in numerous applications, including small gas engines. The drain valve of the invention includes several embodiments and generally may include a valve body, an o-ring, and a cap. The disclosed drain valve eliminates the need for a tool, such as a wrench, to drain the fluid from the engine. The drain valve further includes a push-pull or a twist-and-pull cap feature to manipulate the valve; however, the drain cap remains on the drain valve and therefore cannot be lost or misplaced. The drain valve includes a drain cap that can be rotated to direct the fluid flow out of the drain opening in a desired direction and that provides an easy grip for opening and closing the valve.

Other features and advantages of the invention will become apparent to those skilled in the art upon review of the following detailed description, claims and drawings in which like numerals are used to designate like features.

Figure 1:
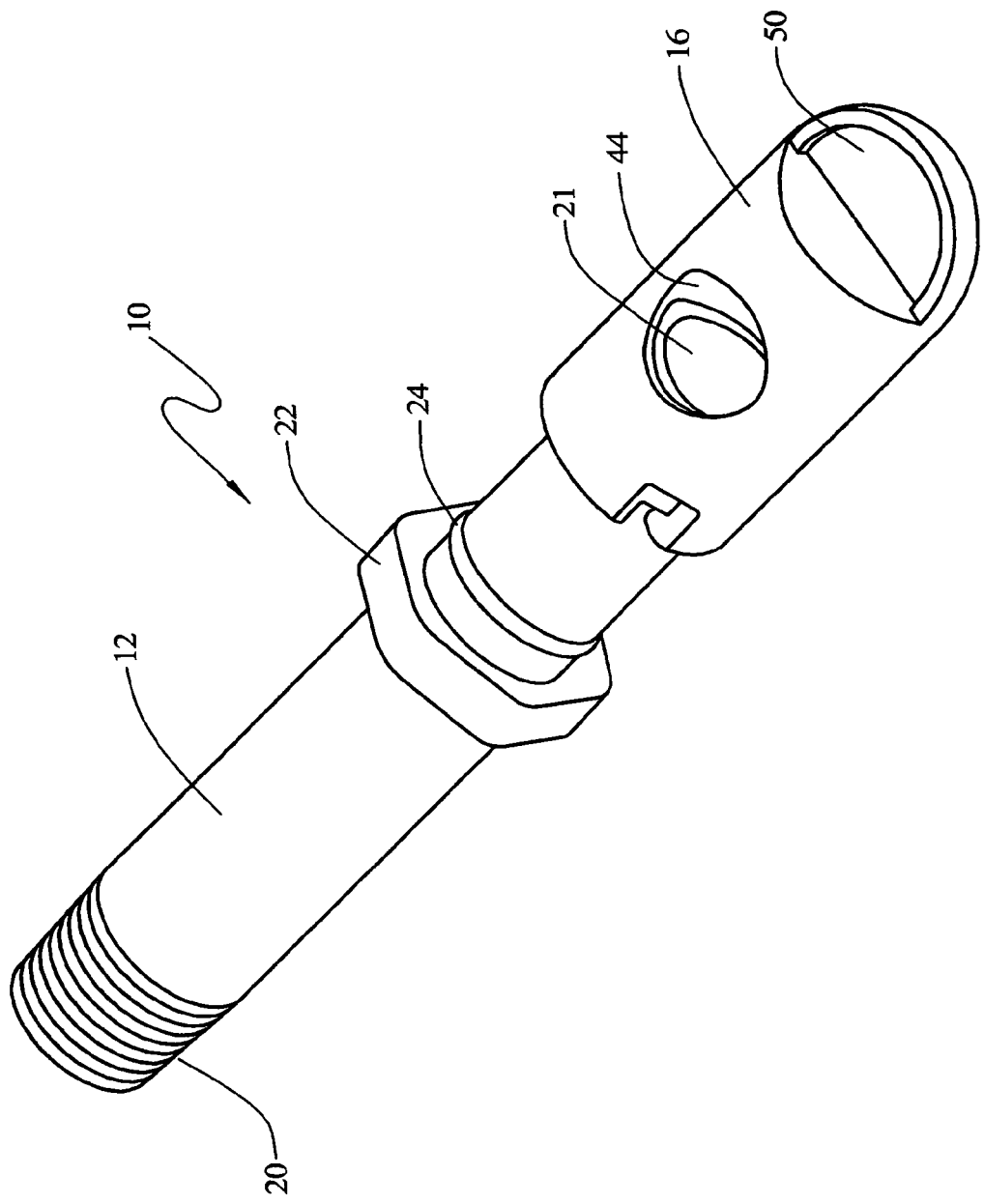
FIG. 1 is an isometric view of an exemplary drain valve of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Figure 2:
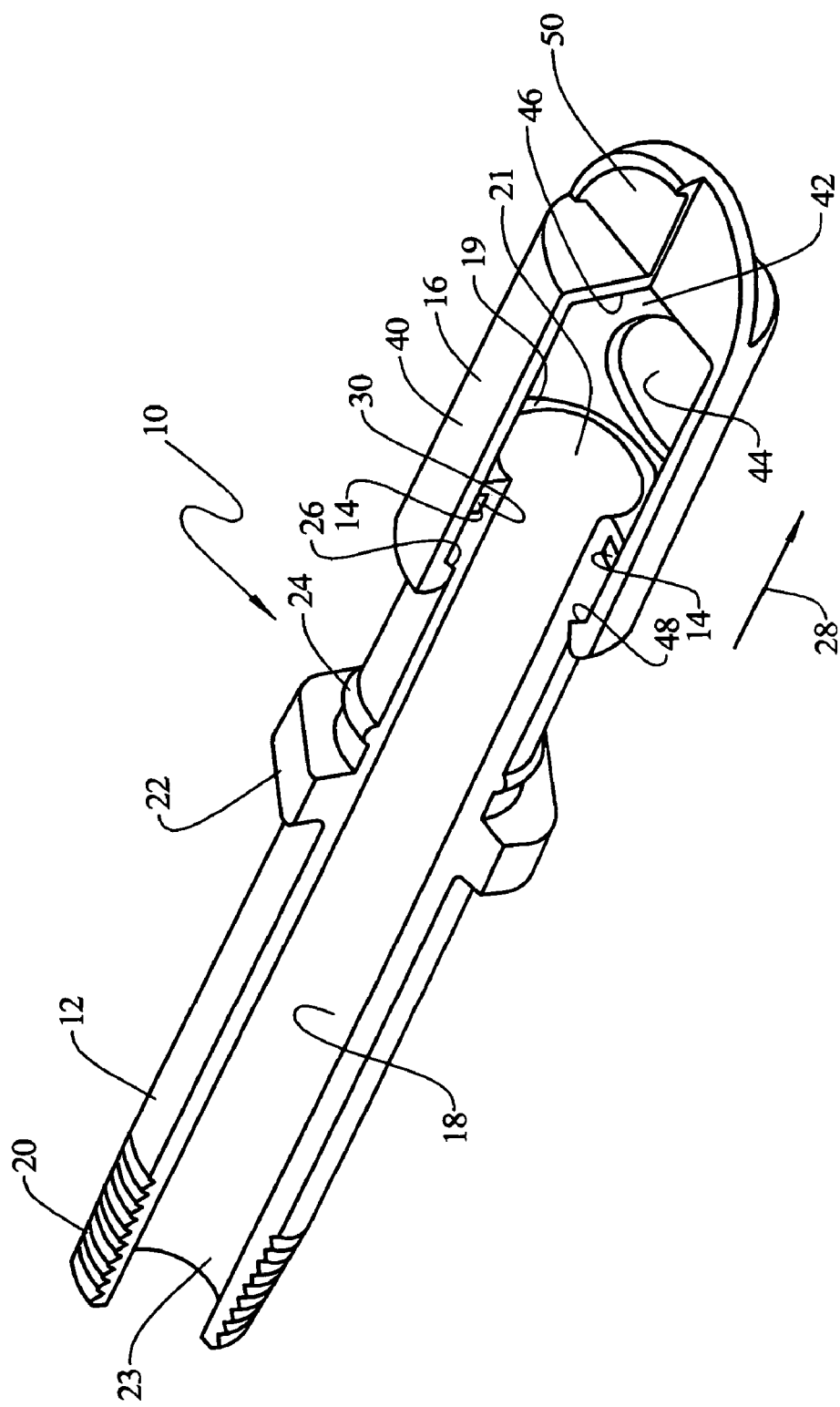
FIG. 2 is a cut-away isometric view of the drain valve of FIG. 1, illustrating the drain valve in an open valve position.
Figure 3:
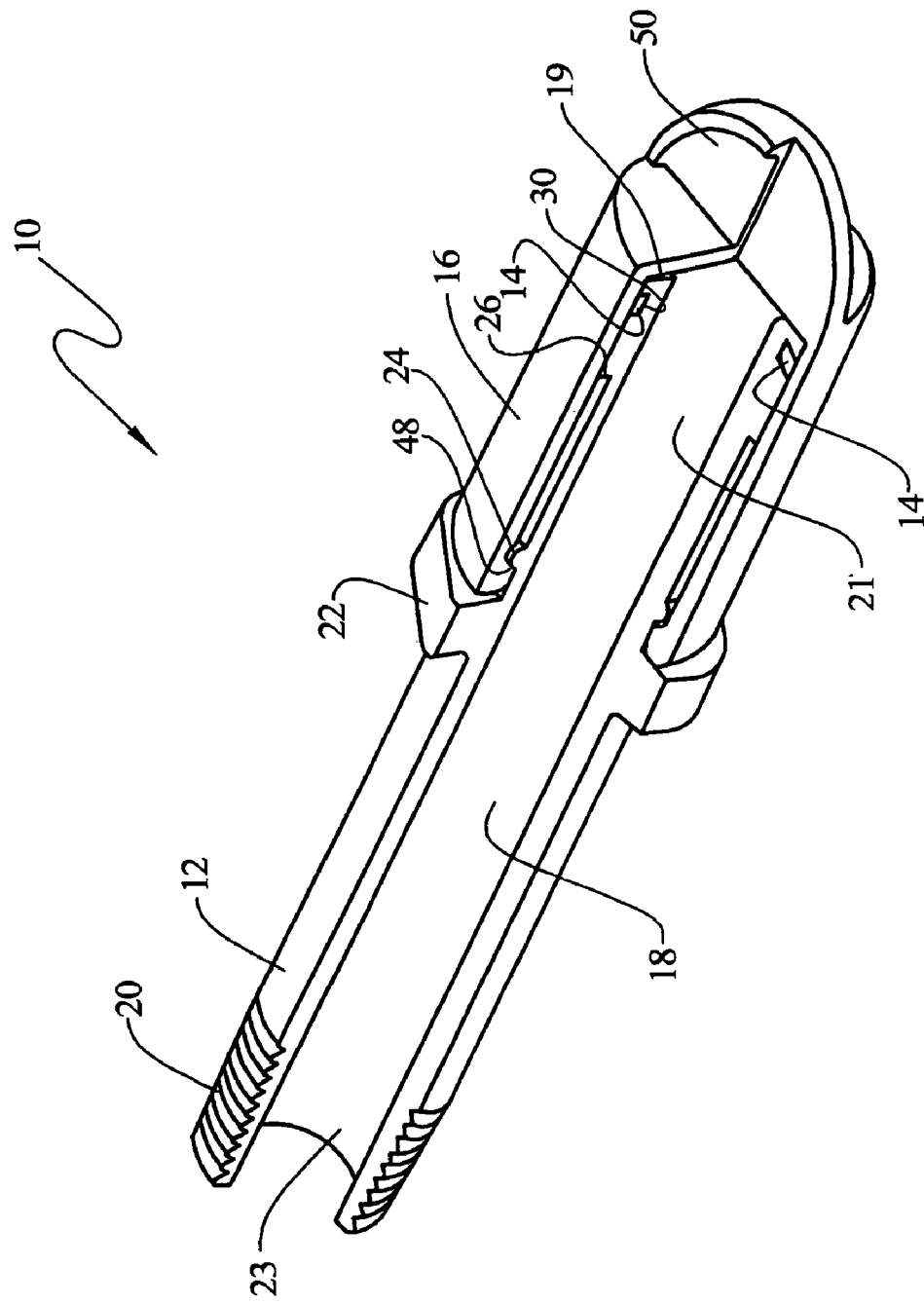
FIG. 3 is a cut-away isometric view of the drain valve of FIG. 1, illustrating the drain valve in a closed valve position.

Referring to the figures there are depicted exemplary embodiments of a drain valve of the present invention. Referring to FIGS. 1–3, there is illustrated an exemplary drain valve 10 for use with an engine, such as small gasoline engine. One skilled in the art will appreciate that the teachings of the present invention may be used with numerous other drain applications in addition to the exemplary applications described herein.

In one embodiment, the exemplary drain valve 10 is a three piece assembly that includes a valve body 12, an o-ring 14, and a cap 16. Referring to FIG. 2, the valve body 12 is generally cylindrical in shape and defines an interior cylindrical passageway 18 extending the length of the body. The valve body 12 also defines a first end 19 having an opening 21 and a second opposing threaded end 20 also having an opening 23. The threaded end 20 is sized to mate with a threaded opening in the engine sump or crankcase, not shown. Positioned on the exterior of the valve body 12 between the first end 19 and the second end 20 is a hexagonal shaped head 22 used to install the threaded end 20 of the valve body 12 to the threaded opening in the engine sump or crankcase. Once the valve body 12 is installed, no tools are required to drain the fluid from the engine sump or crankcase, as described below.

The valve body 12 further includes an annular ring 24 positioned between the head 22 and the end 19 that extends radially outward from the exterior of the valve body 12. The annular ring 24 permits the cap 16 to snap-fit to the valve body 12. Once in this position, as depicted in FIG. 3, the valve 10 will be in a closed position, thereby preventing fluid from flowing out of the valve, as discussed below. The valve body 12 also defines an annular shoulder 26 positioned between the annular ring 24 and the end 19 that prevents the cap 16 from sliding off the valve body 12. In operation, as the cap 16 is pulled away from the annular ring 24 in the direction indicated by direction arrow 28, the annular shoulder 26 serves as a stop preventing the cap 16 from being pulled off the valve body 12. Once in this position, as depicted in FIG. 2, the valve 10 will be in an open position, thereby permitting fluid flow out the valve through an opening 44 in the cap 16, as discussed below. The valve body 12 further defines an annular groove 30 that serves to seat the o-ring 14. The valve body 12 may be made of zinc die cast, rigid plastic, or other suitable material.

The o-ring 14 is installed in the groove 30 and creates a seal between the exterior of the valve body 12 and the interior of the cap 16. A standard rubber o-ring may be used with the invention.

The cap 16 defines a generally cylindrical cap body 40 that is configured to be positioned over the end 19 of the valve body 12. The cap body 40 defines an interior cylindrical passageway 42 and an opening 44. The cap body 40 also defines an interior end wall 46 that serves as a cover over the opening 21 when the cap 16 is in the closed position. The cap body 40 further defines an interior annular ring 48 that will permit the cap 16 to snap-fit over the annular ring 24 on the valve body 12 when the cap 16 is in the closed position. When the cap 16 is pulled to the open position, the annular ring 48 will contact the shoulder 26, thereby preventing the cap 16 from being pulled off the valve body 12. Located on the end of the cap 16 is a tab 50 that serves as a gripping surface for a user to manipulate the cap 16 from a closed position to an open position and vice versa. The cap 16 may be molded from a plastic material, or any other suitable material.

With the embodiment described above, when the cap 16 is pulled, the valve 10 is moved to an open position, as shown in FIG. 2 and as indicated by direction arrow 28, whereby the fluid from the engine will drain from the engine by flowing through the passageways 18, 42 and out the opening 44. As explained above, the cap 16 is retained by the valve body 12 and therefore cannot be lost or misplaced as the fluid is drained. To close the valve 10, the cap 16 is pushed in the direction opposite of direction arrow 28 until the interior annular ring 48 of the cap 16 snap fits over the annular ring 24 of the valve body 12, as shown in FIG. 3. In this position, the fluid from the engine will be prevented from draining because the o-ring 14 creates a seal between the cap 16 and the valve body 12 thus inhibiting the fluid from traveling out the opening 44.

Figure 4:
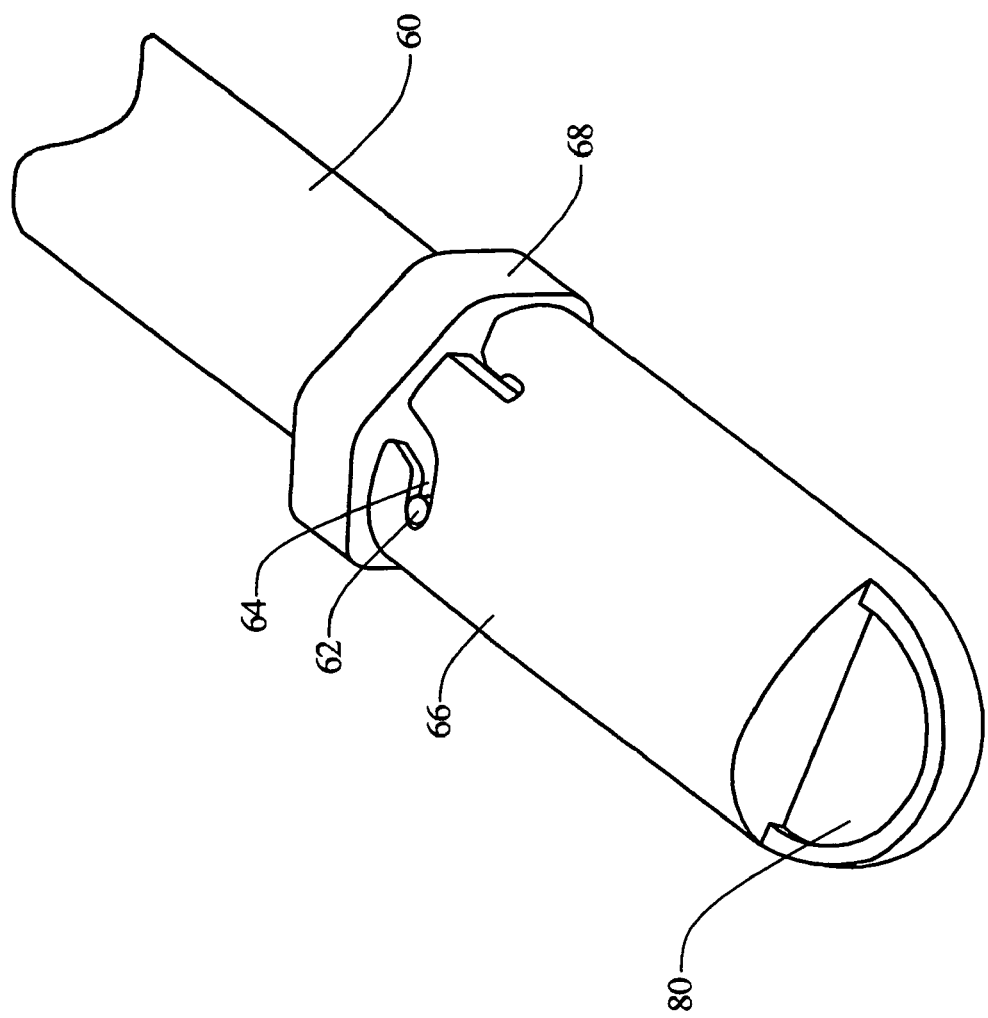
FIG. 4 is an isometric view of another exemplary embodiment of the drain valve of the present invention.
Figure 5:
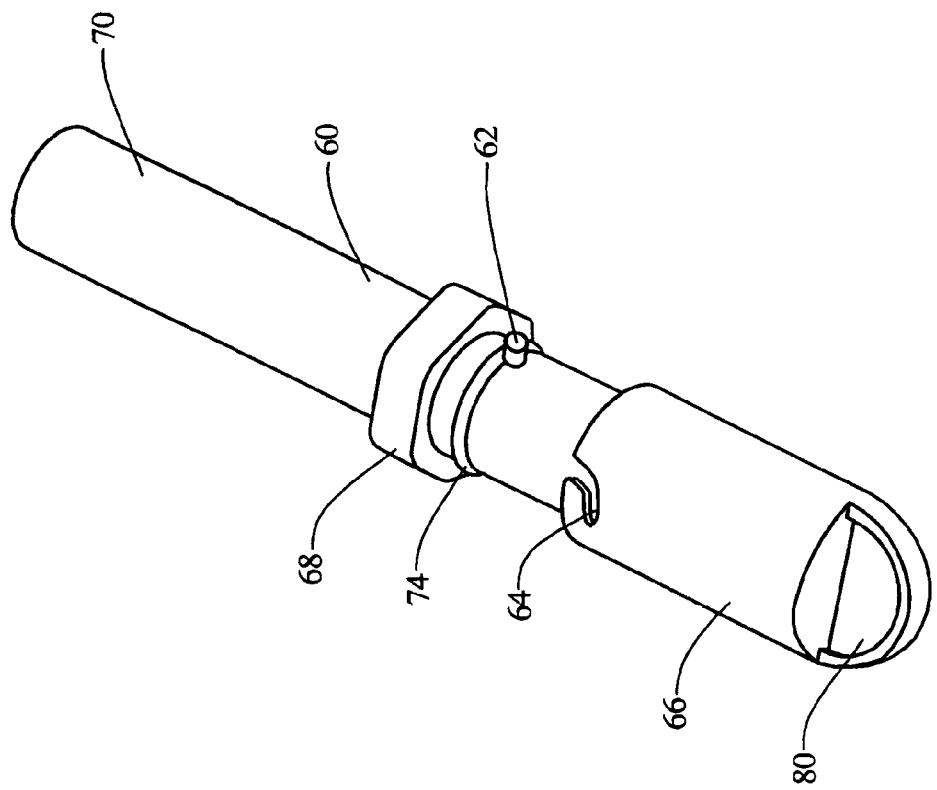
FIG. 5 is an isometric view of the drain valve of FIG. 4 in an open valve position.
Figure 6:
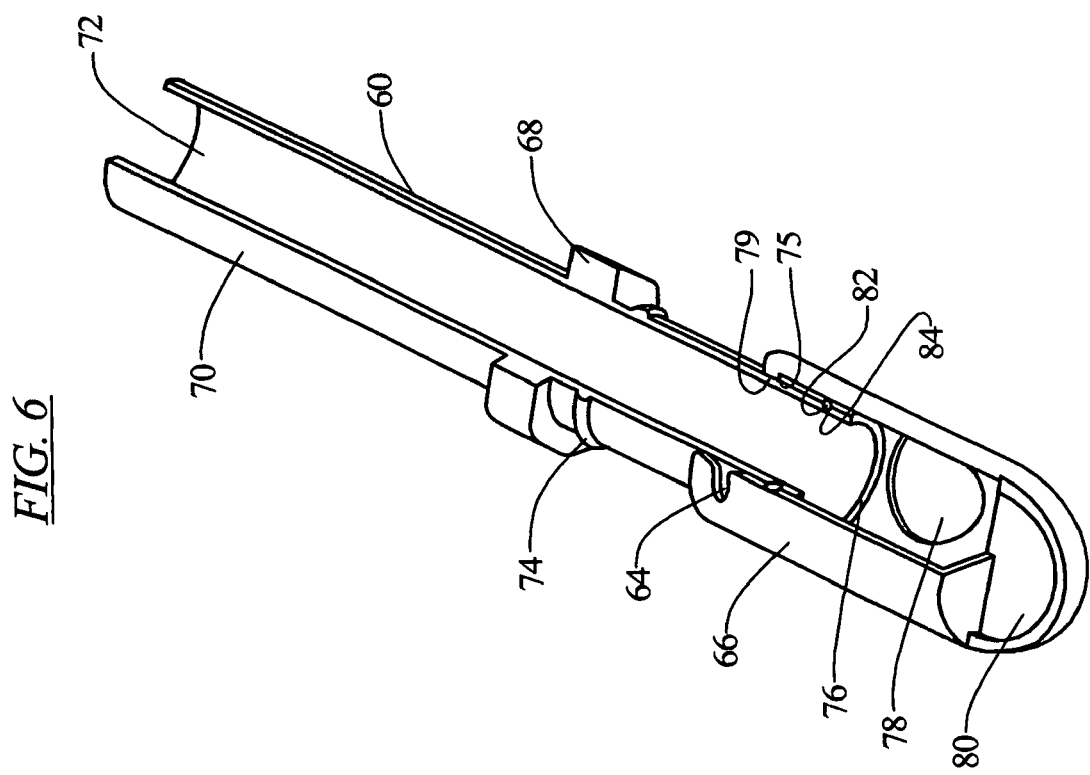
FIG. 6 is a cut-away isometric view of the drain valve of FIG. 4, illustrating the drain valve in an open valve position.

In another embodiment depicted in FIGS. 4–6, a valve body 60 includes one or more pins 62 that mate with one or more actuate shaped slots 64 formed in the cap 66. The pins 62 will engage with and follow the slots 64. With this embodiment, a user must twist and pull the cap 16 to move it from the closed position to an open position. To close the valve, the user must push and twist the cap 66. This feature will be useful with those applications where it is desirable that greater manipulation be needed to open and close the valve. One skilled in the art will appreciate that other shaped slots 64 may be used to provide the additional manipulation of the cap 66. Similar to the embodiment described above, the valve body 60 includes a hexagonal shaped head 68 and a threaded end 70 that will mate with a threaded opening in the engine crankcase or sump, not shown. The valve body 60 further includes an elongated passageway 72 through which will flow the fluid to be drained. The valve body 60 also includes an annular ring 74 that, as described above, will be used to snap-fit the cap 66 to the valve body 60. The valve body 60 further includes an annular shoulder 75 that serves to retain the cap 66 onto the valve body, as described above.

The cap 66 includes a cylindrical shaped passageway 76, an opening 78 extending through the wall of the cap 66, and an inner annular ring 79 used to snap-fit the cap 66 onto the valve body 60, as discussed above. The cap 66 also includes a tab 80 that will serve as a gripping means to assist the user when manipulating the cap 66 from a open position to a closed position and vice versa. Similar to the above embodiment, an o-ring 82 may be placed in a groove 84 formed in the valve body 60. The o-ring 82 creates a seal between the exterior of the valve body 60 and the interior of the cap 66. The remaining features of the valve body 60 and cap 66 are similar to the features of the embodiment described above and will not be repeated here.

Advantageously, with the embodiments described above and illustrated in FIGS. 1–6, no tool is required to operate the cap 16 and thereby open the valve 10 to drain the fluid. In addition, because the cap is retained by the valve body, the cap cannot be inadvertently lost or misplaced. As illustrated, the drain opening 44 is located on the side of the cap 16. With this configuration, the opening 44 may be oriented in a 360-degree manner to permit the user to direct the flow of fluid out of the valve. This feature is beneficial in those applications where the rotational alignment of the valve body to the crankcase or sump varies from one assembly to the next. With the invention, it is no longer necessary to reinstall the drain plug and thus the problems associated with cross-threading, thread stripping, and resulting leakage are avoided.

Figure 7:
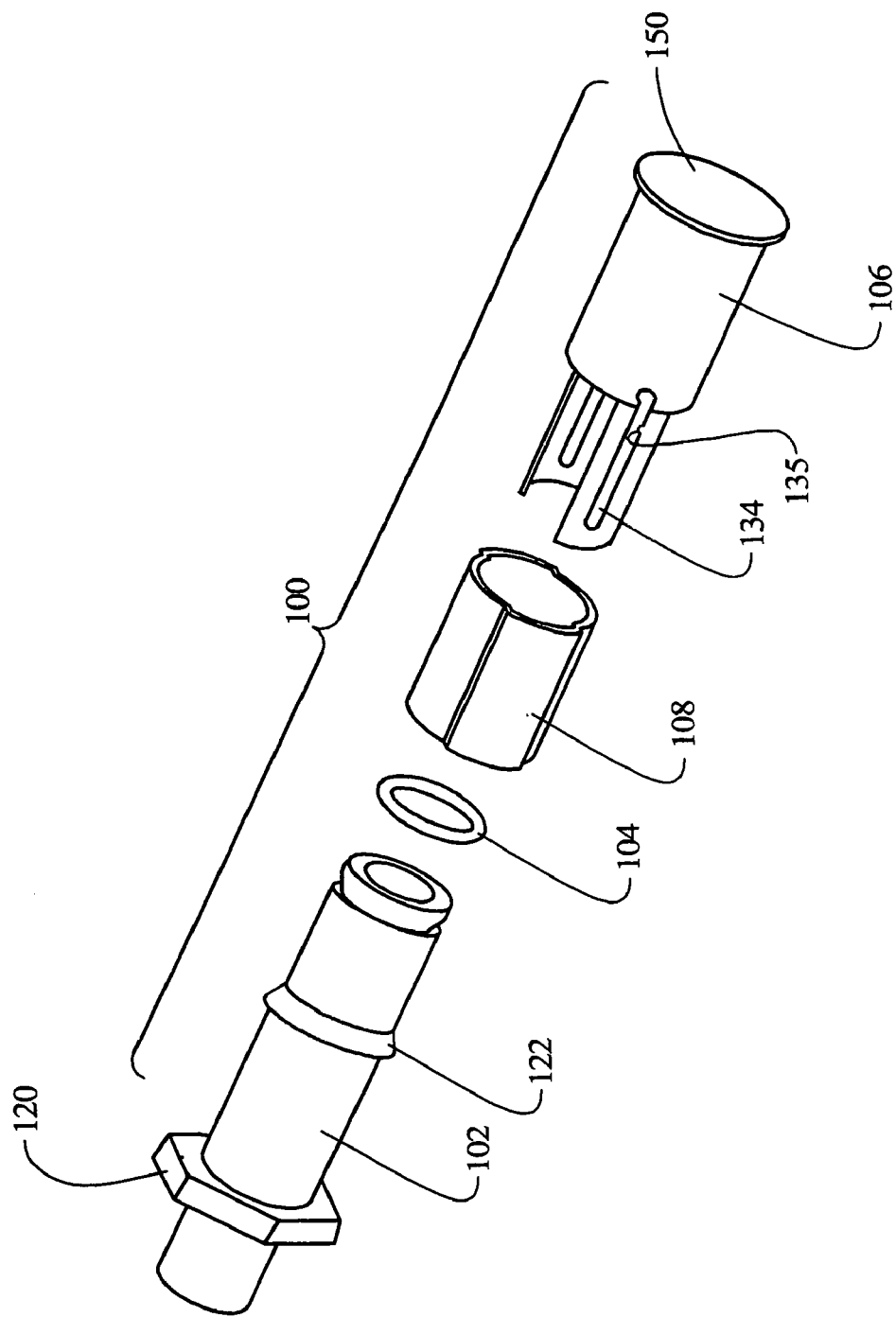
FIG. 7 is an isometric exploded view of yet another exemplary embodiment of the drain valve of the present invention.
Figure 8:
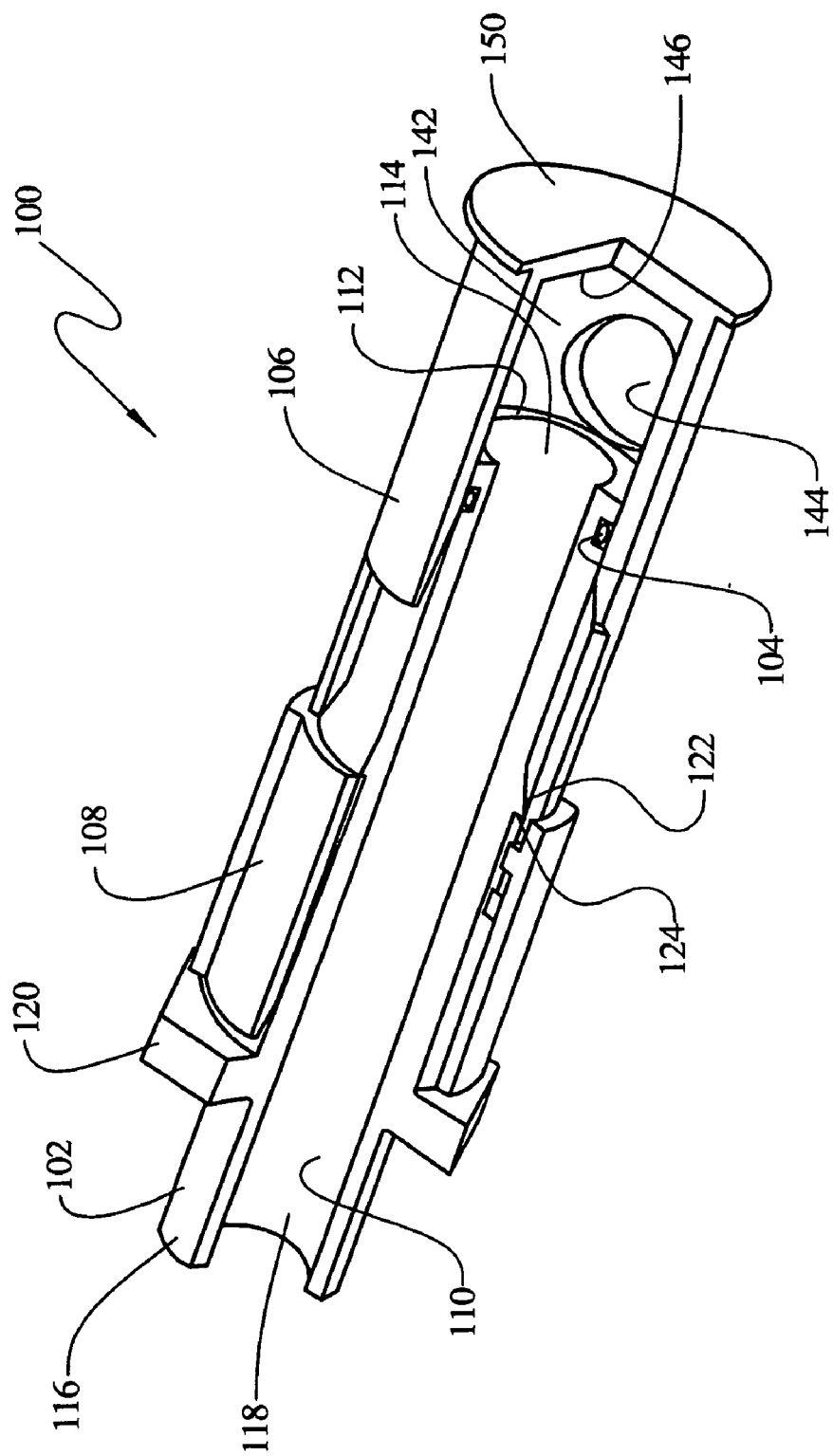
FIG. 8 is an isometric view of the drain valve of FIG. 7, illustrating the drain valve in an open valve position.
Figure 9:
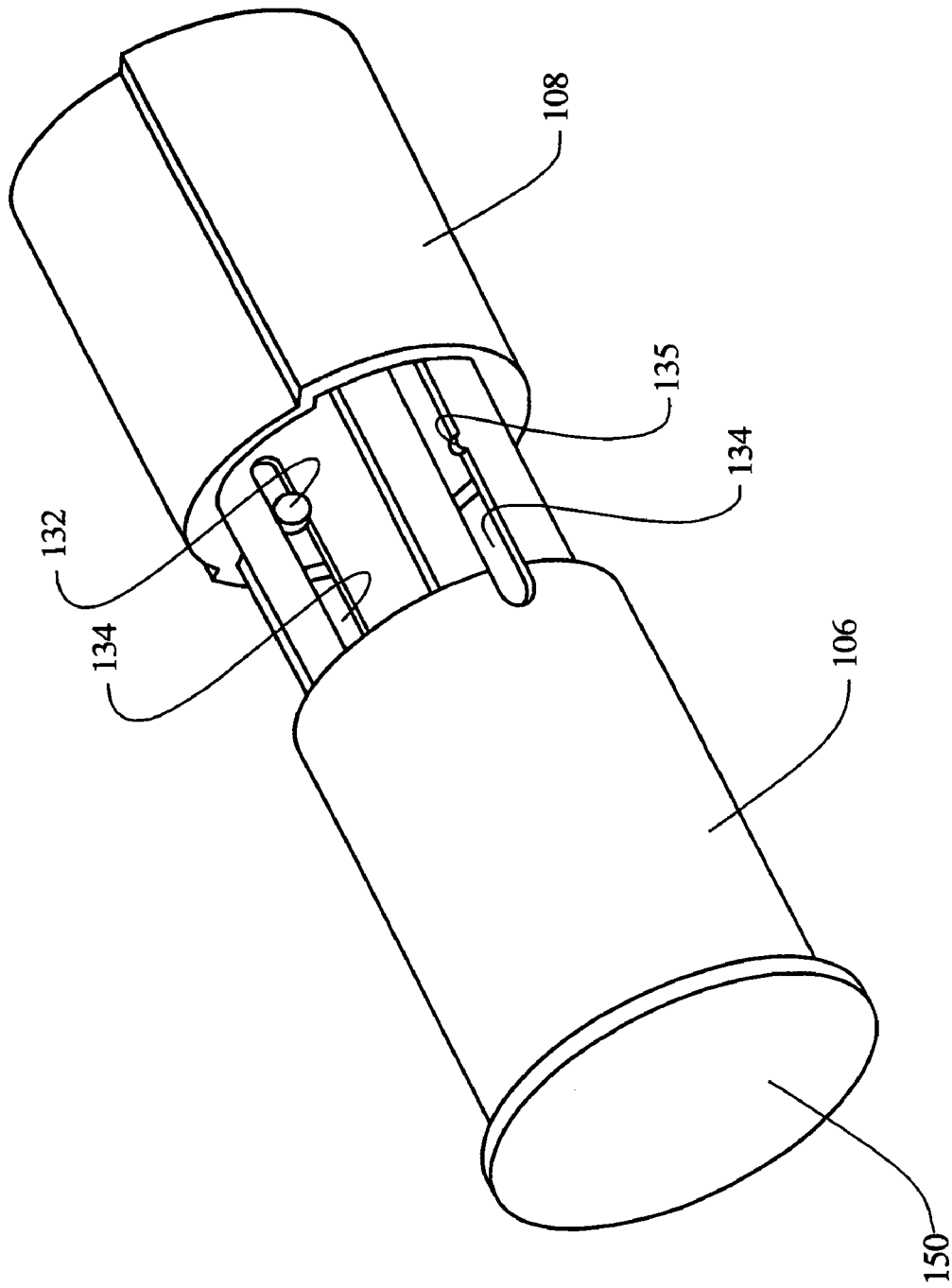
FIG. 9 is an isometric view the cap and cap retainer of the drain valve of FIG. 7.

Referring to FIGS. 7–9, there is illustrated another exemplary embodiment of the invention. As illustrated, an exemplary drain valve 100 is a four piece assembly that includes a valve body 102, an o-ring 104, a cap 106, and a cap retainer 108.

Referring to FIG. 8, the valve body 102 is generally cylindrical in shape and defines an interior cylindrical passageway 110 extending the length of the body. The valve body 102 includes a first end 112 defining an opening 114 and a second opposing threaded end 116 also defining an opening 118. As above, the threaded end 116 is sized and shaped to mate with a threaded opening in the engine crankcase or sump, not shown. Positioned on the exterior of the valve body 102 is a hexagonal shaped head 120 used to install the threaded end 116 of the valve body to the threaded opening in the engine crankcase or sump. The valve body 102 further includes an annular ramp 122 that extends outwardly from the exterior of the valve body 102 and that permits the cap retainer 108 to snap-fit onto the valve body 102. The annular ramp 122 further defines an annular shoulder 124 that serves to retain the cap retainer 108 onto the valve body 102 and to prevent the cap retainer 108 and cap 106 from sliding off the valve body 102. The valve body 102 further defines an annular groove that serves to seat the o-ring 104. As above, the valve body 102 may be made of zinc die cast, rigid plastic, or other suitable material.

Similar to the above embodiments, the o-ring 104 creates a seal between the exterior of the valve body 102 and the interior of the cap 106. Again, a standard rubber o-ring may be used with the invention.

In the exemplary embodiment, the valve 100 includes a cap and retainer assembly that further includes the cap 106 and cap retainer 108. The cap retainer 108 defines a cylindrical body that is sized and configured to be positioned over the exterior of the valve body 102. As assembled, the cap retainer 108 is positioned between the annular shoulder 124 and the hexagonal shaped head 120. The cap retainer 108 includes opposing radially extending pins 132 positioned on the interior wall of the cylindrical body. The pins 132 extend into the interior of the cap retainer and will mate with opposing slots 134 formed in the body wall of the cap 106, as illustrated by FIG. 9.

The slots 134 extend longitudinally along the body of the cap 106 to permit slidable longitudinal movement of the cap 106 relative to the cap retainer 108. In other words, the cap 106 will be permitted to slidably move the length of the slots 134, and the pins 132 will guide the cap 106 along the slots 134. By pulling on the cap 106, the cap 106 will move relative to the cap retainer 108, thereby moving the cap 106 from a closed valve position to an open valve position and vice versa. The slots 134 include detents 135 that serve to snap-fit the cap 106 to the closed valve position.

Referring to FIG. 8, the cap 106 defines a generally cylindrical cap body that is configured to be positioned over the end 112 of the valve body 102. The cap body defines an interior cylindrical passageway 142 and a drain hole or opening 144 through the side wall of the cap body. The cap body also defines an interior end wall 146 that serves as a cover over the opening 114 when the cap 106 is in the closed position. Located on the end of the cap 106 is a cap head 150 or lip that serves as a gripping surface for a user to manipulate the cap 106 from a closed valve position to an open valve position and vice versa. As above, the cap 106 may be molded from a plastic material, or any other suitable material.

With the exemplary embodiment, the cap 106 and retainer 108 can be preassembled by aligning the pins 132 with the slots 134 formed in the cap 106. The cap and retainer subassembly may then be slid over the end 112 of the valve body 102 until the retainer 108 snaps beyond the ramp 122 and is held in position by the shoulder 124 between the shoulder 124 and the head 120. The cap 106 will be positioned across the o-ring 104, which is seated in the groove 109 of the valve body 102. A seal is formed between the cap 106 and the valve body 102. When the cap and retainer subassembly is in position on the valve body 102, the subassembly can be rotated to the desired position to direct the flow of fluid through the passageways 110, 142 and out the drain hole or opening 144 in the cap 106.

The valve 100 is operated in a push-pull manner against the friction of the o-ring 104. When pushing the cap 106, that is when closing the valve, the pins 132 will slide along the slots 134 and the detents 135 will signal when the cap 106 is in the closed position.

Significantly, with the invention the valve 100 has a simple push-pull operation. In addition, the cap 106 is retained to the valve assembly to prevent possible loss. Also, when the valve is activated, the fluid flow can be simply directed by rotating the retainer and cap subassembly. Another benefit of the invention is that the valve 100 has a detent 135 which is felt when the valve is closed. Also, no tools are required to operate the valve 100 once it is installed. Moreover, the cap head or lip 150 at the end of the cap 106 provides easy grip means for opening and closing the valve 100.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fluid drain valve comprising:
   a valve body defining a first threaded end, a second end, and a passage extending through the valve body from the first end to the second end, the valve body further defining an annular ring and a shoulder,
   an o-ring mounted to the valve body, and
   a cap mounted to the valve body at the second end, the cap defining a wall with an opening extending through the wall, the cap also defining a annular ring that will snap-fit over the annular ring on the valve body when the valve is in a closed valve position and that will contact the shoulder on the valve body when the valve is in an open valve position,
   whereby win the valve is in the open valve position, fluid my flow through the opening in the wall of the cap.

2. The fluid drain valve of claim 1 wherein the valve body further includes a means for mounting the valve body to an engine.

3. The fluid drain valve of claim 2 wherein the means for mounting is a hexagonal shaped head configured on the valve body between the first treaded end and the second end.

4. The fluid drain valve of claim 1 wherein the cap defines a cylindrical shaped cap body that permits rotational movement of the cap to provide direction control of fluid out the opening for the cap.

5. The fluid drain valve of claim 4 wherein the cap further defines a tab that may be used for manipulating the cap from a closed valve position to an open valve position and for rotating the cap.

6. The fluid drain valve of claim 1 further comprising a cap retainer mounted to the valve body.

7. The fluid drain valve of claim 6 wherein the cap is mounted to the cap retainer.

8. The fluid drain valve of claim 1 wherein the cap defines a slot and the valve body defines a pin, whereby the pin engage the slot during manipulation of the cap.

9. A fluid drain valve comprising:
   a valve body defining a first threaded end, a second end, and a passageway extending through the valve body, the valve body further defining a shoulder protruding from an exterior surface thereof,
   o-ring mounted to the valve body,
   a cap retainer mounted to the valve body, the cap retainer defining at least one pin, and
   a cap mounted to the cap retainer, the cap positioned over the second end and shoulder of the valve body, the cap defining a wall with an opening extending through the wall and at least one slot for receiving the at least one pin, the cap being movable from a closed valve position to an open valve position,
   whereby when the valve is in the open valve position, fluid may flow through the opening in the wall of the cap.

10. The fluid drain valve of claim 9 wherein the at least one slot includes a detent.

11. The fluid drain valve of claim 9 wherein the valve body further includes a means for mounting the valve body to an engine.

12. The fluid drain valve of claim 11 wherein the means for mounting is a hexagonal shaped configured on the valve body between the first threaded end and the second end.

13. The fluid drain valve of claim 9 wherein the cap retainer defines a cylindrical shaped body that permits rotational movement of the cap retainer and cap to provide direction control of the fluid out the opening in the cap.

14. The fluid drain valve of claim 13 wherein the cap further defines a tab that may be used for manipulating the cap from the closed valve position to the open valve position and for rotating the cap.

15. The fluid drain valve of claim 12 wherein the cap retainer is positioned between to shoulder and the hexagonal shaped head.

16. A fluid drain valve comprising:
- a valve body defining a cylindrical shaped body having first threaded end, a second end, and a passageway extending through the valve body from the first end to the second end, the valve body further defining an annular ring and a shoulder, and
- a cap mounted to the valve body at the second and the to cap defining a cylindrical shaped wall with an opening extending through the wall, the cap also defining an annular ring that will snap-fit over the annular on the valve body when the valve is in a closed valve position and that will be positioned in close proximity to the shoulder on the valve body what the valve is in an open valve position, whereby the cylindrical shaped wall permits rotational movevment of the cap to provide direction control of fluid out the opening in the cap, and whereby when the valve is in the open valve position, fluid may flow through the opening in the cap.

17. The fluid drain valve of claim 16 wherein the valve body further includes a means for mounting the valve body to an engine.

18. The fluid drain valve of claim 17 wherein the means for mounting is a hexagonal shaped head configured on the valve body between the first threaded end and the second end.

19. The fluid drain valve of claim 18 further comprising an o-ring positioned on to valve body.

20. The fluid drain valve of claim 19 wherein the cap further defines a tab that may be used for manipulating the cap from a closed valve position to an open valve position and for rotating to cap.

* * * * *